United States Patent
Ferguson

[15] 3,638,405
[45] Feb. 1, 1972

[54] LAWNMOWER SUSPENSION
[72] Inventor: Hugo S. Ferguson, Averill Park, N.Y.
[73] Assignee: Reel Vortex, Inc., Poestenkill, N.Y.
[22] Filed: Aug. 6, 1970
[21] Appl. No.: 61,659

[52] U.S. Cl..............................................56/10.4, 56/17.2
[51] Int. Cl. .....................................................A01d 53/02
[58] Field of Search ....................56/17.2, 10.4, 249; 180/43, 180/43.16, 43.17

[56] References Cited

UNITED STATES PATENTS

| | | | |
|---|---|---|---|
| 2,671,299 | 3/1954 | Orr | 56/17.2 |
| 2,848,859 | 8/1958 | Abel | 56/17.2 |

Primary Examiner—Louis G. Mancene
Assistant Examiner—J. N. Eskovitz
Attorney—Pennie, Edmonds, Morton, Taylor and Adams

[57] ABSTRACT

A suspension is provided for a lawnmower having a reel and blower conduit forming a crossflow blower which mows without the aid of a fixed bed knife. The front of the mower is supported by a pair of side support members rotatably mounted on respective sides of the mower at points in approximate vertical alignment with the reel axis. Front and intermediate rolling means are mounted on the side support members forwardly and rearwardly of the reel axis, preferably a pair of front wheels and an intermediate roller. Rear rolling means is provided, preferably a pair of wheels. For height adjustment, the side support members are mounted on angularly adjustable lever arms.

7 Claims, 3 Drawing Figures

PATENTED FEB 1 1972

INVENTOR
Hugo S. Ferguson
BY
Pennie Edmonds, Morton, Taylor & Adams
ATTORNEYS

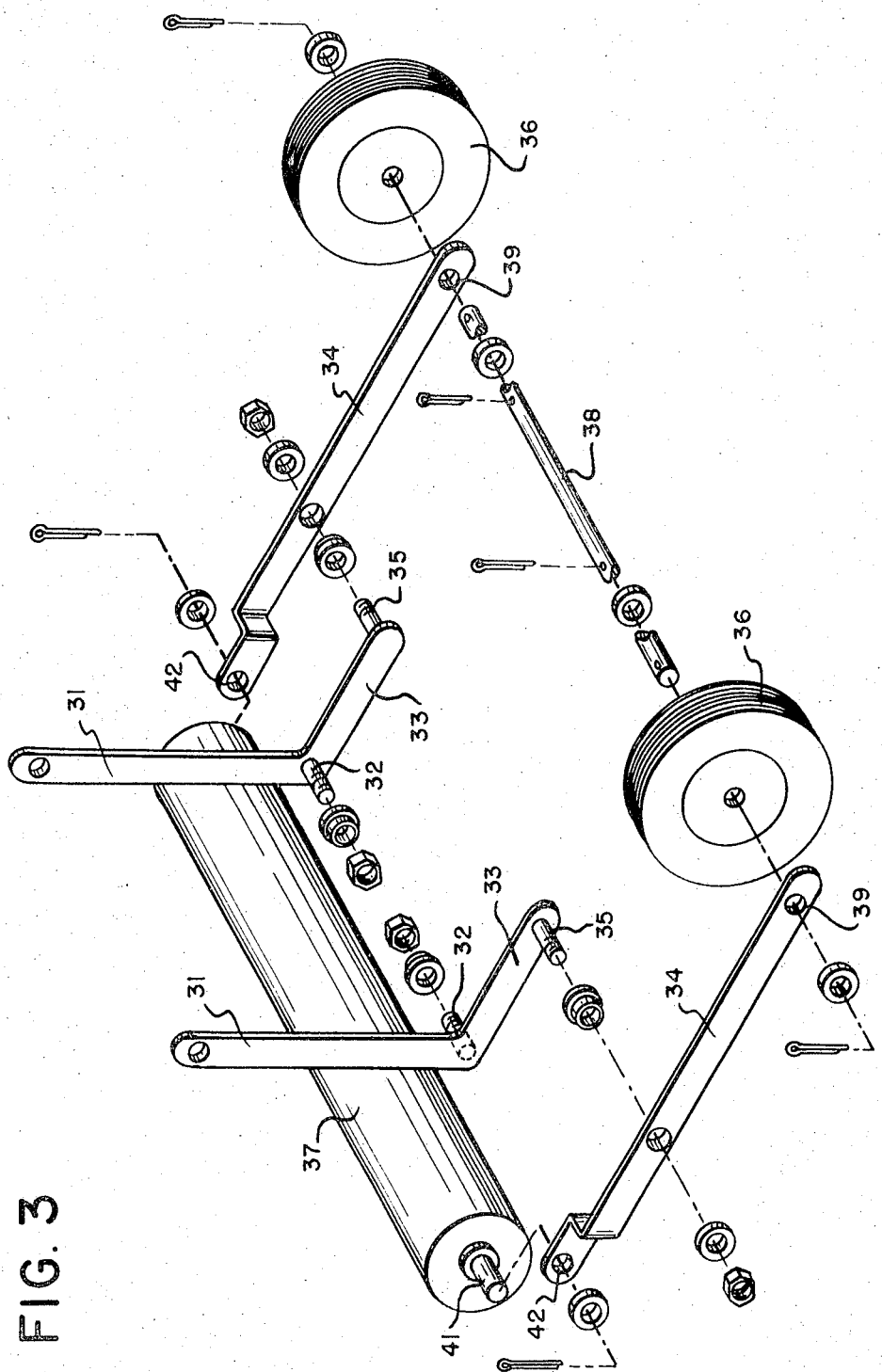

LAWNMOWER SUSPENSION

BACKGROUND OF THE INVENTION

In applications Ser. Nos. 699,596 and 783,192, filed Jan. 22, 1968 and Dec. 12, 1968 by Hugo S. Ferguson, lawnmowers are described in which a cylindrical reel and blower conduit cooperate to form a blower of the crossflow type which mows grass without the aid of a fixed bed knife. In such mowers, the final cutting occurs at the lowest point in the path of travel of the reel blades, vertically below the reel axis. Both two-wheel and four-wheel suspensions are described.

In the two-wheel suspension, the wheel axes are in approximate vertical alignment with the reel axis and this arrangement has the advantage that scalping a lawn at the top of a terrace is eliminated, or at least greatly reduced, assuming that the operator moves the mower up and down the slope. Such a suspension gives good results on a smooth lawn, and on terraces where the upper and lower transitions are even. However, if a lawn is somewhat uneven or rough, and has small depressions or holes which cause one wheel to drop below the other, or if there are narrow sunken regions into which both wheels descend, the mowed surface will be somewhat uneven. Also, if the wheels straddle a ridge, the grass on the ridge will be cut closer or perhaps scalped.

The four-wheel suspension has the advantage of positively positioning the mower with respect to the ground, which may be preferable to some users. Also, the wheels on one side of the mower may be located within the cutting width, thereby allowing the operator to cut closer to objects on one side. Since, however, the reel is intermediate the front and rear wheels, there is greater danger of scalping a lawn at the top of a terrace, and there may be scalping of a ridge straddled by the wheels in either longitudinal or lateral directions.

In either type of suspension, some uncut grass is rolled down and hence may cause uneven cutting under mowing conditions where the grass does not recover quickly. This is especially true where a front wheel is within the cutting width, and rolls down the grass immediately prior to its being cut.

As will be appreciated, the choice of suspensions is to a certain degree a balancing of advantages against disadvantages, and depends on the judgement of the designer as to what will better fulfill the desires of the majority of users. Although the above-described advantages and disadvantages have been particularly directed to mowers of the crossflow blower type, the considerations are also applicable to conventional rotary and reel mowers.

The present invention is directed to a suspension for a mower of the crossflow blower type which largely retains the advantages of the suspensions above discussed, while reducing the disadvantages, and better meets the requirements of the user under a wide variety of mowing conditions.

BRIEF SUMMARY OF THE INVENTION

In accordance with the invention, the front end of a mower of the crossflow blower type is supported approximately in vertical alignment with the reel axis by a suspension including a pair of side support members rotatably mounted on respective sides of the mower at points in approximate vertical alignment with the reel axis. Front and intermediate rolling means are rotatably mounted on the side support members forwardly and rearwardly of the reel axis. The rear end of the mower is supported by rear rolling means.

Preferably, the front rolling means is a pair of wheels mounted on respective side support members; the intermediate rolling means is a roller; and the rear rolling means is a pair of wheels. Also, preferably, the side support members are free for at least limited angular movement relative to each other.

The weight of the front of the mower is distribute between the front wheels and the roller, and advantageously the axes of the front wheels are spaced substantially farther from the axis of rotation of the side support members than the roller axis. This enables the weight carried by the front wheels to be kept low and, with adequately wide wheels, the bearing pressure is low so as to avoid excessive compression of uncut grass. Further, the roller has greater control over the height of the reel. This is desirable since its wide area of contact disregards small depressions, and it is riding on cut grass so that variations in initial grass height are of less importance.

The mower engine is advantageously placed toward the rear of the mower so that the rear wheels carry more of the total weight of the mower than the front suspension, thereby further enabling the pressure of the front wheels on uncut grass to be kept low and also providing adequate traction if power drive is applied to the rear wheels.

To provide for height adjustment, the side support members may be rotatably mounted on lever arms whose pivot points are longitudinally offset from the reel axis, with suitable detents enabling the lever arms to be retained in various angular positions.

The rear wheels and the roller may be designed to roll within the cutting width of the mower, and one of the front wheels similarly arranged, to enable mowing close to objects on one side of the machine.

The front suspension tends to average inequalities in the ground, as will be explained more fully hereinafter, so that a mowed lawn of god appearance can be obtained under a wide variety of conditions encountered in practice.

BRIEF DESCRIPTION OF THE DRAWINGS

FIG. 3 is an exploded view of the front suspension of the mower.

DESCRIPTION OF THE SPECIFIC EMBODIMENT

Figure 1:
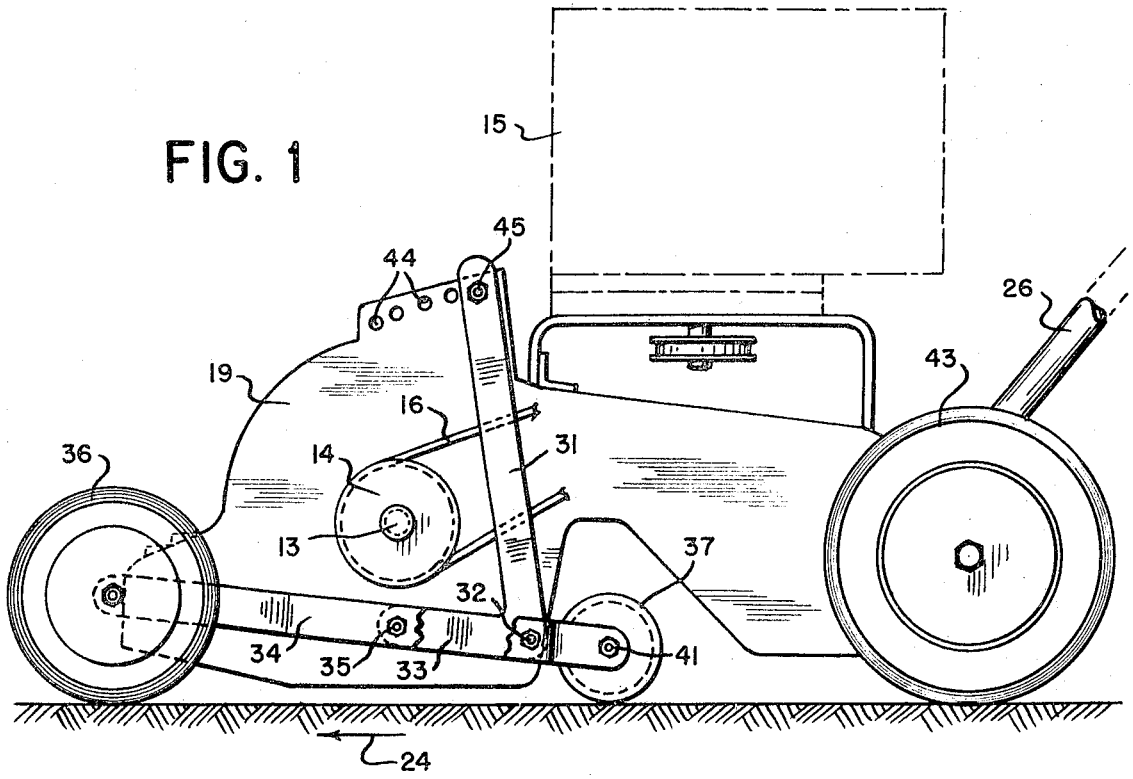
FIG. 1 is a left side view of lawn mower incorporating the suspension of the invention.
Figure 2:
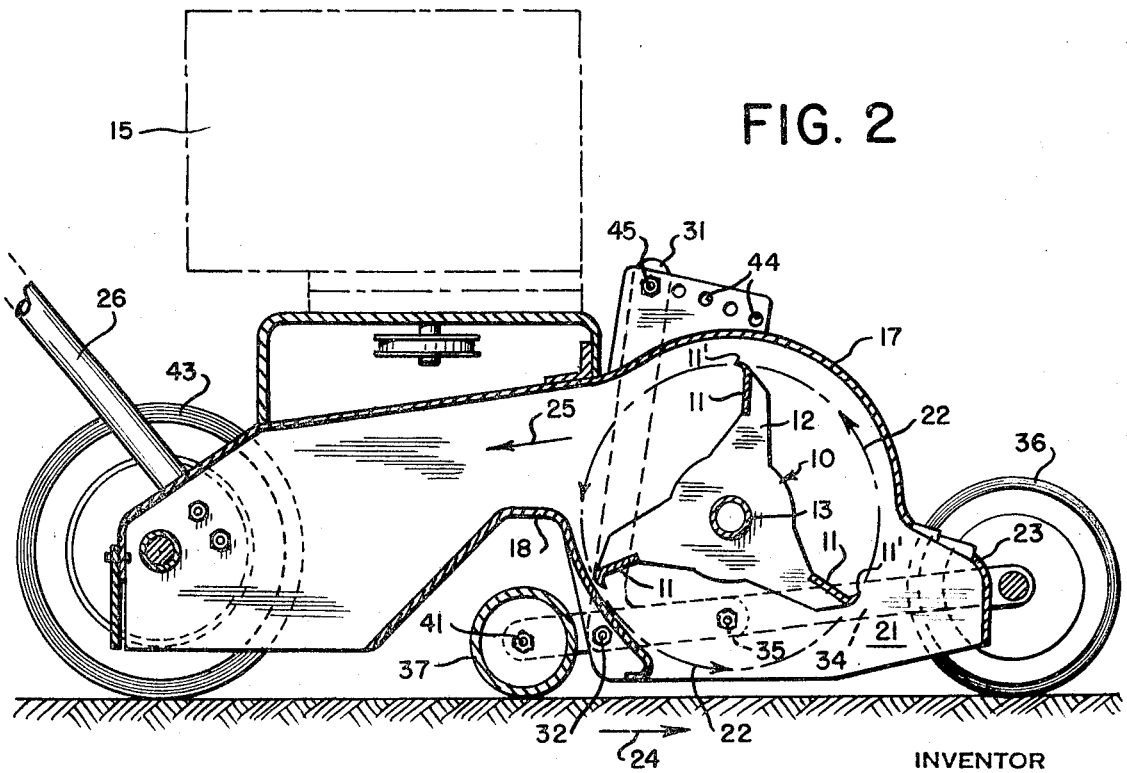
FIG. 2 is a longitudinal cross section of the mower of FIG. 1, taken from the right side thereof.

Referring to the drawings, a lawnmower is illustrated of the type described in the above-identified applications. A cylindrical reel 10 has a plurality of circumferentially spaced blades 11 whose outer leading edges 11' are sharp to form cutting edges. The blades are attached to end plates (not shown) with one or more intermediate supports, one of which is shown at 12. The reel is mounted horizontally and rotates about an axis 13 extending laterally of the mower. A drive pulley 14 is attached to the reel shaft and is driven by a suitable engine, indicated diagrammatically at 15, through a V-belt 16. The details of the belt drive are not shown since they form no part of the present invention.

A blower conduit is formed by upper and lower plates 17, 18 and sideplates, one of which is shown at 19 in FIG. 1. The blower conduit is designed to form, with the rotating reel, a blower of the crossflow type with air flowing through the reel from the inlet region thereof, indicated at 21. The direction of rotation of the reel is with the bottom blades moving in the forward direction of travel of the mower, as indicated by arrows 22. The front end 23 of the housing extends outwardly and downwardly in front of the reel, so as to catch any stones, etc., which may be thrown thereby. The inlet region 21 opens in the forward direction of travel of the mower, indicated by arrow 24, and leaves the portion of the reel thereat exposed to material to be mowed.

As explained in the above-identified applications, due to the crossflow blower action grass is mowed cleanly and effectively without the aid of a fixed "bed knife" or "shear blade." The cut grass passes through the blower conduit as indicated by arrow 25 and is deposited on the ground behind the mower. If desired, provision may be made to collect the grass clippings. A handle 26 is suitably attached at the rear of the mower.

The front of the mower is supported approximately in vertical alignment with the reel axis 13, and means are provided for height adjustment. To this end, a pair of lever arms 31 are rotatably mounted on respective sides of the mower, as by bolts 32 extending through sideplates 19. The axes of rotation provided by bolts 32 are longitudinally spaced from the reel axis 13, in this case rearwardly thereof, and legs 33 of the lever arms extend to vertical lines passing through the reel axis.

A pair of side support members 34 are rotatably mounted on legs 33, as by bolts 35, in approximate vertical alignment with the reel axis 13. A pair of front wheels 36 are rotatably mounted on members 34 forwardly of the reel axis, and a roller 37 is mounted on members 34 rearwardly of the reel axis. A rod 38 extends through holes 39 at the front ends of members 34 and wheels 36 are mounted thereon. Advantageously, rod 38 has sufficient play in holes 39, and rod 41 mounting roller 37 has sufficient play in holes 42, so that the side support members 34 are free for at least limited angular movement with respect to each other. With thin support members 34, holes 39 and 42 need be only slightly greater than the rod diameters to provide for this angular movement. If desired, self-aligning bearings, etc., could be employed. A pair of wheels 43 are attached to the rear of the mower.

Suitably securing means such as nuts, washers, collars, and cotter pins, are illustrated in FIG. 3, but need not be described since they are conventional, and other securing means could be employed as desired.

The rear wheels 43 may be laterally within the cutting width of reel 10, so as not to roll down grass prior to cutting. The front wheel on the opposite side of the mower from pulley 14 may also be located within the cutting width, so that the operator can mow close to objects on that side. Thus the left wheel as seen in FIG. 3 is mounted inside the support member 34.

At least one front wheel will roll down uncut grass. The other may or may not, depending on whether the operator overlaps in mowing adjacent strips. With the suspension of the invention, it is possible to employ very low pressures on the front wheels, so as to reduce this adverse effect. Thus, in the specific embodiment shown, the distance from pivot axes 35 of the side support members to the axes of the front wheels 36 is greater than that to the axis of roller 37, so that roller 37 supports more of the weight of the front of the mower than wheels 36. Also, the engine 15 may be positioned so that more weight is supported by rear wheels 43 than by the front end suspension.

The distribution of weight is a matter of judgement of the designer, and due consideration should be given to overall stability.

Considering now the operation of the front suspension, its general effect is to tend to average inequalities in ground level such as small depressions, ridges, etc. The effect on the reel of individual movements of the front wheels and roller is reduced, so that local unevenness or roughness of ground has less effect on the overall mowing. For example, if both front wheels travel into a narrow depression, the reel will be lowered by a lesser amount until the roller 37 enters the depression, and as the front wheels rise out of the depression the reel will be raised somewhat. If one wheel drops into a shallow hole, the relative angular movement of support members 34, together with the sustaining effect of roller 37, will allow the reel to tilt only slightly. In traveling over a longitudinal ridge, roller 37 will raise the reel somewhat, to mitigate against scalping. On traverse ridges, the reel will be raised somewhat, also to mitigate against scalping. Further, the roller has greater control over the height of the reel, since it is closer to the pivot points 35. This, together with its extended contact with the ground, tends to disregard small depressions. Also, the roller is rolling on cut grass, so that variations in the height of the uncut grass has a smaller effect on the cutting height. Thus, the suspension accommodates itself to a wide variety of lawn conditions to yield a satisfactory cut.

While the use of wheels at front and rear, and an intermediate roller, is the presently preferred arrangement, together with some freedom for relative movement of the side support members, if desired wheels could be substituted for the roller, a roller could be used in place of the rear wheels, and a rigid frame could be used for the front suspension. Substituting a roller for the front wheels, while possible, is considered undesirable since it will be rolling on uncut grass and hence the initial height of the uncut grass will have a greater effect, as well as requiring greater force to propel the mower.

To adjust the height of cut, lever arms 31 may be moved to various angular positions, thereby lowering or raising the pivot axis 35 of the side support members and consequently raising or lowering reel 10 with respect to the ground. The lever arms may be retained in the desired position by any suitable detent means. As here shown, the upper ends of the lever arms may be aligned with any of holes 44 in the sides of the mower housing and retained in place by bolts 45.

With the simple lever arm arrangement shown, the pivot axes 35 will not remain in exact vertical alignment with the reel axis 13 in all lever positions. However, for the normal range of height adjustment required in practice, departures from exact vertical alignment will be acceptable, since only approximate vertical alignment will suffice.

To turn the mower, the front end will be raised and the suspension will be free to rotate about pivot points 35. With a light roller 37, the weight of the front wheels will overbalance the roller and the suspension will turn until the roller contacts lower plate 18 of the housing. If desired, detents could be provided to limit the rotation of the suspension, or spring bias could be provided to keep the front wheels from dropping, etc.

I claim:
1. A lawnmower comprising
   a. a cylindrical reel having a plurality of circumferentially spaced blades,
   b. means for mounting said reel horizontally on said mower with the reel axis extending laterally thereof,
   c. driving means for rotating said reel about the axis there,
   d. the outer edges of said blades being sharp to form cutting edges,
   e. and a blower conduit cooperating with said reel to form a blower of the crossflow type with air flowing through the reel from the inlet region thereof,
   f. at least a portion of said inlet region opening in the forward direction of travel of the mower and leaving a portion of the reel thereat exposed to material to be mowed, wherein the improvement comprises
   g. rear rolling means mounted on said mower near the rear thereof,
   h. a pair of side support members rotatably mounted on respective sides of said mower at points in approximate vertical alignment with the reel axis,
   i. said side support members extending forwardly and rearwardly of the reel axis,
   j. and front and intermediate rolling means mounted on said side support members forwardly and rearwardly of the reel axis, respectively.

2. A lawnmower in accordance with claim 1 in which said side support members are free for at least limited angular movement relative to each other.

3. A lawnmower in accordance with claim 1 in which said rear rolling means is a pair of laterally spaced wheels, said front rolling means is a pair of front wheels mounted on respective side members, and said intermediate rolling means is a roller extending between said side support members.

4. A lawnmower in accordance with claim 3 in which the axes of said front wheels are spaced substantially farther from the axis of rotation of said side support members than the axis of said roller.

5. A lawnmower in accordance with claim 4 in which said side support members are free for at least limited angular movement relative to each other.

6. A lawnmower in accordance with claim 1 including a pair of lever arms rotatably mounted on respective sides of said mower at respective points longitudinally spaced from the reel axis and having respective legs extending to vertical lines through the reel axis, said side support members being rotatably mounted on said legs of the lever arms, and height adjustment means for adjustably securing said lever arms in a plurality of angular positions thereof.

7. A lawnmower in accordance with claim 5 including a pair of lever arms rotatably mounted on respective sides of said mower at respective points longitudinally spaced from the reel axis and having respective legs extending to vertical lines through the reel axis, said side support members being rotatably mounted on said legs of the lever arms, and height adjustment means for adjustably securing said lever arms in a plurality of angular positions thereof.

* * * * *